United States Patent Office 3,514,466
Patented May 26, 1970

3,514,466
TRIAZOLONE COMPOUND
Helmut Stähle, Rheinstrasse 168; Karl Heinz Hauptmann, Boehringer Str. 9; Karl Zeile, Taunusstrasse 11; and Peter Danneberg, Am Lenneberg 2, all of Ingelheim am Rhine, Germany
No Drawing. Filed Dec. 14, 1966, Ser. No. 601,570
Claims priority, application Germany, Dec. 15, 1965, B 84,988
Int. Cl. C07d 55/06
U.S. Cl. 260—308                        1 Claim

ABSTRACT OF THE DISCLOSURE

Substitution products of 1,2,4-triazolone-(5) of the formula $$\begin{array}{c} N\!-\!\!-\!\!-\!\!-\!N\!-\!R \\ \parallel \quad \quad \mid \\ R_1\!-\!C \quad \quad C\!=\!O \\ \diagdown \!N\! \diagup \\ \mid \\ R_2 \end{array}$$

wherein

R is selected from the group consisting of lower alkyl, (di-lower alkyl-amino)-lower alkyl and lower carbalkoxy-methyl.
$R_1$ is selected from the group consisting of hydrogen, lower alkyl, cyclohexyl, phenyl and phenyl-lower alkyl, and
$R_2$ is selected from the group consisting of lower alkyl, cyclohexyl, phenyl and phenyl having 1 to 2 substituents selected from the group consisting of lower alkyl, lower alkoxy and halogen attached thereto, useful as sedatives and hypnotics in warm-blooded animals.

---

This invention relates to novel 1,2,4-triazolones-(5) of the formula $$\begin{array}{c} N_2\!-\!\!-\!\!-\!_1N\!-\!R \\ \parallel \quad \quad \mid \\ R_1\!-\!C^3 \quad {}^5C\!=\!O \\ \diagdown \!{}^4\!N\! \diagup \\ \mid \\ R_2 \end{array} \quad (I)$$

wherein R is selected from the group consisting of lower alkyl, di-lower alkyl-amino-lower alkyl and lower carbalkoxy-methyl, $R_1$ is selected from the group consisting of hydrogen, lower alkyl, cyclohexyl, phenyl and phenyl-lower alkyl, and $R_2$ is selected from the group consisting of lower alkyl, cyclohexyl, phenyl and phenyl having 1 to 2 substituents selected from the group consisting of lower alkyl, lower alkoxy and halogen, such as chlorine, attached thereto, and to a process for the preparation of the said 1,2,4-triazolones-(5). The invention also relates to novel sedative and hypnotic compositions and to a method of inducing sleep and hypnotic conditions in warm-blooded animals.

The novel 1,2,4-triazolones-(5) of the Formula I above exhibit useful therapeutic properties and particularly possess antiphlogistic, analeptic and sedative properties.

It is an object of the invention to provide the novel 1,2,4-triazolones-(5) of the Formula I.

It is another object of the invention to provide a process for the preparation of the novel 1,2,4-triazolones-(5) of the Formula I.

It is a further object of the invention to provide novel sedative and hypnotic compositions.

It is an additional object of the invention to provide a novel method for inducing sleep and hypnotic conditions in warm-blooded animals.

These and other objects and advantages of the invention will become apparent from the following detailed description.

The novel class of compounds of the invention consists of 1,2,4-triazolones-(5) of the Formula I, as defined above.

Particularly preferred compounds of the invention are compounds of Formula I where R is methyl, $R_1$ is selected from the group consisting of hydrogen, methyl, ethyl, cyclohexyl and phenyl, and $R_2$ is selected from the group consisting of cyclohexyl, phenyl and phenyl substituted with 1 to 2 members of the group consisting of lower alkyl and halogen. Especially preferred is 1,3-dimethyl-4-(2',4'-dichlorophenyl)-1,2,4-triazolone-(5).

The non-toxic, pharmacologically acceptable acid addition salts of the compounds of the Formula I, which possess a basic amino group, may be derived from organic or inorganic acids, such as hydrochloric acid, citric acid, tartaric acid, etc.

The process of the invention for the preparation of the novel 1,2,4-triazolones-(5) of the Formula I comprises reacting a 1,2,4-triazolone-(5) of the formula $$\begin{array}{c} N\!-\!\!-\!\!-\!\!-\!NH \\ \parallel \quad \quad \mid \\ R_1\!-\!C \quad \quad C\!=\!O \\ \diagdown \!N\! \diagup \\ \mid \\ R_2 \end{array} \quad (II)$$

wherein $R_1$ and $R_2$ have the same meanings as in Formula I, with an alkali metal base in an inert solvent to form the alkali metal salt of the said 1,2,4-triazolone-(5), reacting the latter at temperatures between room temperature and reflux temperatures in an aqueous or inert organic solvent with a compound of the formula $$R\!-\!X \quad (III)$$

wherein R has the same meanings as in Formula I and X is selected from the group consisting of halogen and —OSO$_3$R, to form a 1,2,4-triazolone-(5) of the Formula I and recovering the latter. The acid addition salts or quaternary ammonium salts may also be formed by known methods if the novel 1,2,4-triazolones-(5) possess an amino group.

Examples of compounds of the Formula III are alkyl halides, such as ethyl iodide; di-alkylaminoalkyl halides, such as $\alpha$-chloro-$\beta$-dimethylamino ethane; dialkyl sulfuric acid esters, such as dimethyl sulfate; and halo-acetic acid alkyl esters.

It is surprising that good yields could be obtained by the process of the invention, which comprises substituting the $N_1$ atom of a hydrazine carboxylic acid amide, since the only known reaction for this type of compound is that the hydroxy group of analogous 5-hydroxy-triazoles can be etherified or esterified.

The novel sedative and hypnotic compositions of the invention are comprised of a compound of the Formula I and a pharmaceutical carrier.

The method of the invention of inducing sleep and hypnotic conditions in warm-blooded animals comprising administering to said animals an effective amount of a compound of the Formula I. The average dosage is from 10 to 250 mg., preferably from 25 to 100 mg., of the said compound.

The 1,2,4-triazolones-(5) of Formula II, which are used as starting materials for the process of the invention, may be prepared according to the process described in German Pat. No. 1,126,882.

The following examples describe several preferred embodiments to illustrate the invention. However, it should be understood that the invention is not intended to be limited to the specific embodiments.

EXAMPLE 1

1,3-dimethyl-4-phenyl-1,2,4-triazolone-(5)

18 g. of 3-methyl-4-phenyl-1,2,4-triazolone-(5) were dissolved in 51.6 cc. of 2 N sodium hydroxide. The solution reacted alkaline to phenolphthalein. Thereafter, while vigorously stirring, 13.8 cc. of dimethylsulfate were slowly added to the solution, taking care that the temperature did not rise above 30° C. After termination of the methylation reaction, the reaction mixture was made strongly alkaline with sodium hydroxide, and the reaction product was extracted with benzene. The benzene extraction solution was distilled off in vacuo and the distillation residue was recrystallized from a mixture of benzene and isopropyl ether. The yield amounted to 16.6 g. and the product had a melting point of 111–112.5° C. The infra-red spectrum as well as chemical analysis showed that the product was 1,3-dimethyl-4-phenyl-1,2,4-triazolone-(5).

EXAMPLE 2

1-methyl-3,4-diphenyl-1,2,4-triazolone-(5)

Under the same conditions as those described in Example 1, 9.6 g. of 3,4-diphenyl-1,2,4-triazolone-(5) were dissolved in 20.5 cc. of 2 N sodium hydroxide, and the solution was reacted at 20–25° C. with 5 cc. of dimethylsulfate. The yields amounted to 8.7 g. of 1-methyl-3,4-diphenyl-1,2,4-triazolone-(5) having a melting point of 174–175° C.

EXAMPLE 3

1-ethyl-3-isopropyl-4-phenyl-1,2,4-triazolone-(5)

5 g. of 3-isopropyl-4-phenyl-1,2,4-triazolone-(5) were dissolved in 75 cc. of tetrahydrofuran, and 1.1 g. of sodium amide were added to the solution. After about 3 hours the sodium salt of the said triazolone had formed. After adding 18 g. of ethyl iodide, the reaction mixture was refluxed for 3 to 4 hours then the solvent was evaporated in vacuo, and the residue was taken up in ether. The ether solution was shaken with 2 N sodium hydroxide and then the ether phase was dried with magnesium sulfate, and the ether was distilled off. After the distillation of the solvent, 5 g. of crystalline 1-ethyl-3-isopropyl-4-phenyl-1,2,4-triazolone-(5) having a melting point of 76–77° C. were obtained which could be recrystallized from petroleum ether.

EXAMPLE 4

1-(β-dimethylamino-ethyl)-3-isopropyl-4-phenyl-1,2,4-triazolone-(5)

The sodium salt of 3-isopropyl-4-phenyl-1,2,4-triazolone-(5) was refluxed for 4 to 5 hours with α-chloro-β-dimethylamino-ethyl as described in the preceding example. After distilling off the solvent, the residue was dissolved in dilute hydrochloric acid and the acid solution was then shaken with benzene in order to separate any unreacted starting material. Thereafter the aqueous solution was made strongly alkaline with sodium hydroxide and 1-(β-dimethyl-amino-ethyl)-3-isopropyl-4-phenyl-1,2,4-triazolone - (5) separated out in the form of an oil. The oily compound was taken up in ether and the solution was dried. After distilling off the solvent, the base was dissolved in alcoholic hydrochloric acid. After addition of isopropyl ether, the hydrochloride of 1-(β-dimethylamino-ethyl)-3-isopropyl-4-phenyl-1,2,4-triazolone-(5) crystallized out. After again recrystallizing the hydrochloride compound it had a melting point of 146–148° C.

EXAMPLE 5

1-(β-dimethylamino-ethyl)-3,4-diphenyl-1,2,4-triazolone-(5)

Using the process of Example 4, the sodium salt of 3,4-diphenyl-1,2,4-triazolone-(5) was reacted with α-chloro-β-dimethylamino-ethyl to form 1-(β-dimethyl-amino-ethyl)-3,4-diphenyl-1,2,4 - triazolone - (5) which when crystallized from alcoholic hydrogen chloride formed the hydrochloride salt of 1-(β-dimethylamino-ethyl)-3,4-diphenyl-1,2,4-triazolone-(5) having a melting point of 216–217° C.

EXAMPLE 6

1-(β-dimethylamino-ethyl)-3,4-di-cyclohexyl-1,2,4-triazolone-(5)

Using the procedure of Example 4, the sodium salt of 3,4-di-cyclohexyl-1,2,4-triazolone-(5) was reacted with α-chloro-β-dimethylamino-ethyl to form 1-(β-dimethyl-amino-ethyl)-3,4-di-cyclohexyl-1,2,4-triazolone(5) which when crystallized from alcoholic hydrogen chloride formed the hydrochloride salt of 1-(β-dimethylamino-ethyl)-3,4-dicyclohexyl-1,2,4-triazolone-(5) having a melting point of 175–176° C.

EXAMPLE 7

1-(β-dimethylamino-ethyl)-3-methyl-4-phenyl-1,2,4-triazolone-(5)

Using a procedure of Example 4, the sodium salt of 3-methyl-4-phenyl-1,2,4-triazolone-(5) was reacted with α-chloro-β-dimethylamino-ethyl to form 1-(β-dimethyl-amino-ethyl)-3-methyl-4-phenyl-1,2,4 - triazolone whose hydrochloride salt had a melting point of 174–176° C.

EXAMPLE 8

1-methyl-3-phenyl-4-ethyl-1,2,4-triazolone-(5)

Using the procedure of Example 1, 3-phenyl-4-ethyl-1,2,4-triazolone-(5) was reacted with dimethyl sulfate to form 1-methyl-3-phenyl-4-ethyl-1,2,4-triazolone-(5) having a boiling point of 130° C. at 0.2 mm. Hg.

EXAMPLE 9

1-methyl-3-isopropyl-4-cyclohexyl-1,2,4-triazolone-(5)

Using the procedure of Example 1, 3-isopropyl-4-cyclohexyl-1,2,4-triazolone-(5) was reacted with dimethyl sulfate to form 1-methyl-3-isopropyl-4-cyclohexyl-1,2,4-triazolone-(5) having a melting point of 83° C.

EXAMPLE 10

1,4-dimethyl-3-phenyl-1,2,4-triazolone-(5)

Using the procedure of Example 1, 3-phenyl-4-methyl-1,2,4-triazolone-(5) was reacted with dimethyl sulfate to obtain 1,4-dimethyl-3-phenyl-1,2,4-triazolone-(5) having a melting point of 138° C.

EXAMPLE 11

1-methyl-3-isopropyl-4-phenyl-1,2,4-triazolone-(5)

Using the procedure of Example 1, 3 - isopropyl - 4-phenyl - 1,2,4 - triazolone-(5) was reacted with dimethyl sulfate to obtain 1-methyl-3-isopropyl-4-phenyl-1,2,4-triazolone-(5) having a melting point of 103° C.

EXAMPLE 12

1,4-dimethyl-3-(α-phenyl-isopropyl)-1,2,4-triazolone-(5)

Using the procedure of Example 1, 3 - (α - phenyl-isopropyl)-4-methyl-1,2,4-triazolone-(5) was reacted with dimethyl sulfate to obtain 1,4-dimethyl-3-(α-phenyl-isopropyl)-1,2,4-triazolone-(5) having a melting point of 96° C.

EXAMPLE 13

1-methyl-3-cyclohexyl-4-phenyl-1,2,4-triazolone-(5)

Using the procedure of Example 1, 3 - cyclohexyl - 4-phenyl-1,2,4-triazolone-(5) was reacted with dimethyl sulfate to obtain 1-methyl-3-cyclohexyl-4-phenyl-1,2,4-triazolone-(5) having a melting point of 98° C.

EXAMPLE 14

1-methyl-2,4-di-cyclohexyl-1,2,4-triazolone-(5)

Using the procedure of Example 1, 3,4-di-cyclohexyl-1,2,4-triazolone-(5) was reacted with dimethyl sulfate to obtain 1-methyl - 3,4 - di-cyclohexyl-1,2,4-triazolone-(5) having a melting point of 94° C.

EXAMPLE 15

1-methyl-3-cyclohexyl-4-isopropyl-1,2,4-triazolone-(5)

Using the procedure of Example 1, 3 - cyclohexyl - 4-isopropyl-1,2,4-triazolone-(5) was reacted with dimethyl sulfate to obtain 1-methyl-3-cyclohexyl-4-isopropyl-1,2,4-triazolone-(5) having a boiling point of 129° C. at 0.2 mm. Hg.

EXAMPLE 16

1-methyl-4-phenyl-1,2,4-triazolone-(5)

16.1 g. of 4-phenyl-1,2,4-triazolone-(5) were dissolved in 100 cc. of 2 N sodium hydroxide and 80 cc. of water. Accompanied by vigorous stirring and at a temperature of 25° C., 11.4 cc. of dimethylsulfate were added dropwise to the solution over a period of 15 minutes, and the resulting mixture was stirred at this temperature for about 1 hour. Then, the 1-methyl-4-phenyl-1,2,4-triazolone-(5) which precipitated out was separated by filtration, washed with water and dried. The yield was 11.0 g. (62.8% of theory). The product had a melting point of 155–157° C.

EXAMPLE 17

1-methyl-3-tert-butyl-4-cyclohexyl-1,2,4-triazolone-(5)

Using the procedure of Example 1, 3 - tert - butyl - 4-cyclohexyl-1,2,4-triazolone-(5) was reacted with dimethyl sulfate to form 1-methyl-3-tert-butyl-4-cyclohexyl-1,2,4-triazolone-(5) having a melting point of 69–70° C.

EXAMPLE 18

1-carbethoxymethyl-3-isopropyl-4-phenyl-1,2,4-triazolone-(5)

Using the procedure of Example 3, the sodium salt of 3 - isopropyl-4-phenyl-1,2,4-triazone-(5) was reacted with carbethoxymethyl iodide to form 1-carbethoxymethyl-3-isopropyl-4-phenyl-1,2,4-triazolone-(5) having a melting point of 114–116° C.

EXAMPLE 19

1-methyl-3-propyl-4-cyclohexyl-1,2,4-triazolone-(5)

Using the procedure of Example 1, 3-propyl - 4 - cyclohexyl-1,2,4-triazolone-(5) was reacted with dimethyl sulfate to form 1-methyl-3-propyl-4-cyclohexyl-1,2,4-triazolone-(5) having a boiling point of 117–119° C. at 0.4 mm. Hg.

EXAMPLE 20

1-ethyl-3-propyl-4-cyclohexyl-1,2,4-triazolone-(5)

Using the procedure of Example 3, the sodium salt of 3-propyl-4-cyclohexyl - 1,2,4 - triazolone-(5) was reacted with ethyl iodide to form 1-ethyl-3-propyl-4-cyclohexyl-1,2,4-triazolone having a boiling point of 108–110° C. at 0.2 mm. Hg.

EXAMPLE 21

1-ethyl-3-tert-butyl-4-cyclohexyl-1,2,4-triazolone-(5)

Using the procedure of Example 3, the sodium salt of 3-tert-butyl-4-cyclohexyl-1,2,4-triazolone-(5) was reacted with ethyl iodide to form 1-ethyl-3-tert-butyl-4-cyclohexyl-1,2,4-triazolone-(5) having a melting point of 53–54° C.

EXAMPLE 22

1-(dimethyl-ethyl-ammonium ethyl)-3-isopropyl-4-phenyl-1,2,4-triazolone-(5)-iodide 1 - ($\beta$ - dimethylamino-ethyl) - 3 - isopropyl-4-phenyl-1,2,4-triazolone-(5), prepared according to Example 4, was reacted with ethyl iodide to form 1-(dimethyl-ethyl-ammonium ethyl)-3-isopropyl-4-phenyl-1,2,4 - triazolone-(5)-iodide having a melting point of 173° C.

EXAMPLE 23

1-(dimethyl-ethyl-ammonium ethyl)-3,4-diphenyl-1,2,4-triazolone-(5)-iodide

1 - ($\beta$ - dimethylamino - ethyl)-3,4-diphenyl-1,2,4 - triazolone-(5), prepared according to Example 5, was reacted with ethyl iodide to form 1-(dimethyl-ethyl-ammonium ethyl)-3,4 - diphenyl-1,2,4-triazolone-(5)-iodide having a melting point of 182–184° C.

EXAMPLE 24

1-(dimethyl-ethyl-ammonium ethyl)-3-methyl-4-phenyl-1,2,4-triazolone-(5)-iodide 1 - ($\beta$ - dimethylamino - ethyl) - 3 - methyl - 4 - phenyl-1,2,4-triazolone-(5) was reacted with ethyl iodide to form 1-(dimethyl-ethyl-ammonium ethyl)-3-methyl-4-phenyl-1,2,4-triazolone-(5)-iodide having a melting point of 144–146° C.

EXAMPLE 25

1,3-dimethyl-4-(2'-ethylphenyl)-1,2,4-triazolone-(5)

10.2 g. of 3-methyl-4-(2'-ethylphenyl)-1,2,4-triazolone-(5) were dissolved in 28 cc. of 2 N sodium hydroxide and 50 cc. of water in a 3-necked flask provided with a stirrer and a thermometer. Accompanied by vigorous stirring and at a temperature of 20–25° C., 6 cc. of dimethylsulfate were added dropwise to the solution over a period of 15 minutes, and then the temperature of the mixture was maintained at 30° C. for an additional 2 hours. Thereafter, the reaction mixture was made alkaline with 4 N sodium hydroxide, and the alkaline mixture was shaken 3 times with 50 cc. portions of chloroform. The chloroform solution was washed with water until neutral, dried with magnesium sulfate, filtered, and the solvent was distilled from the filtrate. About 8 g. of a light oil remained behind, which was fractionally distilled in a high vacuum. 7.1 g. (70% of theory) of 1,3-dimethyl-4-(2'-ethylphenyl)-1,2,4-triazolone-(5) were obtained, which had a boiling point of 128–130° C. at 0.4 mm. Hg.

EXAMPLE 26

1,3-dimethyl-4-(2'-methyl-4'-chlorophenyl)-1,2,4-triazolone-(5)

18.7 g. of 3-methyl-4-(2'-methyl-4'-chlorophenyl)-1,2,4-triazolone-(5) were dissolved in 100 cc. of 2 N sodium hydroxide and 80 cc. of water. The resulting solution was admixed with 9.6 cc. of dimethylsulfate at 25° C., and the resulting mixture was stirred at this temperature for about 1 hour. Then 1,3-dimethyl-4-(2'-methyl-4'-chlorophenyl)-1,2,4-triazolone-(5) which precipitated out was separated by vacuum filtration, washed with water and dried. The yield was 12.9 g. (65% of theory). The product had a melting point of 128–130° C.

EXAMPLE 27

1,3-dimethyl-4-(2'-chlorophenyl)-1,2,4-triazolone-(5)

23.1 g. of 3-methyl-4-(2'-chlorophenyl)-1,2,4-triazolone-(5) were dissolved in 130 cc. of 2 N sodium hydroxide and 100 cc. of water. The resulting solution was admixed with 12.5 cc. of dimethylsulfate at 25° C. and the mixture was stirred at this temperature for one-half to one hour. Then 1,3-dimethyl-4-(2'-chlorophenyl)-1,2,4-triazolone-(5) which separated out was separated by vacuum filtration, washed with water and dried. The yield of 18.5 g. was 75.0% of theory. The product had a melting point of 63–66° C.

EXAMPLE 28

1-methyl-3-ethyl-4-(2'-methyl-4'-chlorophenyl)-1,2,4-triazolone-(5)

26.5 g. of 3-ethyl-4-(2'-methyl-4'-chlorophenyl)-1,2,4-triazolone-(5) were dissolved in 130 cc. of 2 N sodium hydroxide and 100 cc. of water. The resulting mixture was admixed with 12.5 cc. of dimethylsulfate at 25° C. and the mixture was stirred for one hour at 25–30° C. The 1-methyl-3-ethyl-4-(2' - methyl - 4' - chlorophenyl)-1,2,4-triazolone-(5) which precipitated out was separated by vacuum filtration, washed with water and dried. The yield of 21.7 g. was 80% of theory. The product had a melting point of 76–78° C.

EXAMPLE 29

1-methyl-3-n-propyl-4-(2′-methyl-4′-chlorophenyl)-1,2,4-triazolone-(5)

24.2 g. of 3-n-propyl-4-(2′-methyl-chlorophenyl)-1,2,4-triazolone-(5) were dissolved in 110 cc. of 2 N sodium hydroxide and 90 cc. of water. The resulting solution was admixed with 11.0 cc. of dimethylsulfate at 25° C. and the reaction mixture was stirred for about one hour at 25–30° C. The 1-methyl-3-n-propyl-4-(2′-methyl-4-chlorophenyl)-1,2,4-triazolone-(5) precipitated thereby was separated by vacuum filtration, washed with water and dried. The yield of 18.3 g. was 72% of theory. The product had a melting point of 95–97° C.

EXAMPLE 30

1-methyl-3-ethyl-4-(2′-methoxyphenyl)-1,2,4-triazolone-(5)

25.0 g. of 3-ethyl-4-(2′-methoxyphenyl)-1,2,4-triazolone-(5) were dissolved in 130 cc. of 2 N sodium hydroxide and 100 cc. of water. The solution was admixed with 12.9 cc. of dimethylsulfate at 25° C. and the resulting reaction mixture was stirred for one-half to one hour at 25–30° C. 1-methyl-3-ethyl-4-(2′-methoxyphenyl)-1,2,4-triazolone-(5) precipitated out. After separation of the precipitate by vacuum filtration, washing with water and drying, the yield was 16.7 g. (63% of theory). The product had a melting point of 121–122.5° C.

EXAMPLE 31

1,3-dimethyl-4-(2′,4′-dichlorophenyl)-1,2,4-triazolone-(5)

68.0 g. (0.33 mol) of acetic acid-N-(2,4-dichlorophenyl)-amide were suspended in 350 cc. of dry benzene, and then 74.6 g. (0.33 mol) of phosphorus pentachloride were added to the suspension at 15–20° C., whereby a clear solution was formed. The reaction solution was then allowed to stand for one-half hour at room temperature and was subsequently heated for three hours at 50° C. Thereafter, the solution was evaporated in vacuo, and the residue was dissolved in 50 cc. of absolute benzene. The resulting solution was added dropwise at 15–20° C. to a solution of 35.0 g. of hydrazine-carboxylic acid ethyl ester in 27 cc. of dry pyridine and 200 cc. of absolute benzene, accompanied by vigorous stirring. The mixed solution was then stirred for one-half hour at room temperature and for five hours at 50° C., and was allowed to cool. Thereafter, the reaction solution was stirred with about 150 cc. of 2 N sodium hydroxide, petroleum ether was added, and the precipitate formed thereby was separated by vacuum filtration. The filter cake was washed with water and dried, yielding 35.6 g. of the corresponding amidrazone, melting point 163–165° C.

The amidrazone thus obtained was admixed with about 250 cc. of 2 N sodium hydroxide, and the mixture was boiled for about 10 minutes, whereby virtually complete dissolution occurred. Thereafter, while the solution was still hot, it was filtered through charcoal to remove the small amount of insoluble matter, the filtrate was cooled with ice, and then concentrated hydrochloric acid was added thereto until it reacted acid to Congo red. The precipitate formed thereby was separated by vacuum filtration, washed with ice water and dried, yielding 16.1 g. (53.8% of theory) of 3-methyl-4-(2′,4′-dichlorophenyl)-1,2,4-triazolone-(5), melting point 215–217.5° C.

7.1 g. of the triazolone thus obtained were dissolved in a mixture of 25 cc. of 2 N sodium hydroxide and 20 cc. of water, the solution was admixed at 25° C. with 4.8 cc. of dimethylsulfate within a period of 30 minutes, and the mixture was stirred at 25° C. for one hour. Thereafter, an additional 8.7 cc. of 2 N sodium hydroxide were added, and the reaction mixture was stirred at 25° C. for 4 hours more. The reaction mixture was then vacuum filtered, and the filter cake was washed with water and dried. 5.3 g. (70.6% of theory) of 1,3-dimethyl-4-(2′,4′-dichlorophenyl)-1,2,4-triazolone-(5), melting point 130–131° C. after recrystallization from ethylacetate, were obtained. The product was thin-film-chromatographically pure.

*Analysis.*—Calculated (percent: Cl. 27.48. Found (percent): Cl. 27.72.

For pharmaceutical purposes the compounds of the invention are administered to warm-blooded animals perorally or parenterally as active ingredients in customary dosage unit compositions, that is, compositions in dosage unit form consisting essentially of an inert pharmaceutical carrier and one dosage unit of the active ingredient, such as tablets, coated pills, solutions, suspensions, emulsions, capsules, wafers, suppositories and the like. One dosage unit of the compounds according to the invention is from 0.16 to 4.2 mgm./kg. body weight, preferably from 0.4 to 1.7 mgm./kg. body weight.

The following examples illustrate a few dosage unit compositions comprising a compound of the present invention as an active ingredient. The parts are parts by weight unless otherwise specified.

EXAMPLE 32

*Tablets.*—50 parts by weight of 1,3-dimethyl-4-(2′,4′-dichlorophenyl)-1,2,4-triazolone-(5), 80 parts of lactose and 30 parts of corn starch were granulated with an aqueous solution containing 2 parts of gelatin. The resulting granulate was admixed with another 30 parts of corn starch, 3 parts of colloidal silicic acid, 2 parts of stearic acid and 3 parts of talcum and the mixture was pressed into tablets weighing 200 mgm. each.

EXAMPLE 33

*Suppositories.*—To form suppository compositions, 60 parts by weight of 1,3-dimethyl-4-(2′,4′-dichlorophenyl)-1,2,4-triazolone-(5) was uniformly admixed with 240 parts of lactose. The resulting mixture was introduced into 1700 parts of a molten suppository base (cocoa butter) and the mixture was poured into suppository molds.

EXAMPLE 34

*Capsules.*—50 parts by weight of 1-methyl-3-ethyl-4-(2′,4′-dichlorophenyl)-1,2,4-triazolone-(5) was uniformly admixed with 150 parts of potato starch, 7 parts of talcum and 3 parts of stearic acid and the mixture was filled into capsules.

EXAMPLE 35

*Syrup.*—A portion of 100 cc. of demineralized water was used to prepare a syrup from 55 g. of cane sugar and the rest of the water was used to prepare a slurry with 1.8 g. of carboxymethyl cellulose. 1 g. of 1,3-dimethyl-4 - (2′,4′-dichlorophenyl) - 1,2,4-triazolone-(5) was admixed with 2 g. of colloidal silicic acid and the resulting mixture was mixed first with the carboxymethyl cellulose slurry and then the cane sugar syrup. 0.01 g. of wild cherry flavoring, 0.07 g. of methyl p-amino-benzoate and 0.03 g. of propyl p-amino-benzoate, dissolved in 5 g. of ethanol were mixed with the said resulting suspension. 5 cc. (1 teaspoon) of the syrup comprise 50 mgm. of 1,3-dimethyl-4-(2′,4′-dichlorophenyl-1,2,4-triozolone-(5).

PHARMACOLOGICAL DATA

The compounds of the invention are extraordinarily effective sedatives and hypnotics and are useful as tranquilizers and sleep-inducing agents.

The sedative and hypnotic properties of the compounds were tested on mice. The compounds tested were used in an oil-in-water emulsion prepared with gum arabic and the emulsion was adminstered to the animals per os. The tests conducted were (1) the occurrence of atoxia, (2) the loss of the righting reflex and (3) the loss of the spinal lateral reflex. For comparison, 2-methyl-3-o-tolyl-4-(3H)-quinazolinone (methaqualone), a known effective sleep-inducing agent, was also tested.

The method of G. Kärber (Archiv für experimentelle Pathologie und Pharmakologie, vol. 162, 1931, p. 184) was used to calculate the average effective does ($ED_{50}$) which is the dose which in 50% of the mice produced a corresponding, provable effect. The average lethal dose ($LD_{50}$) was also determined. The results are summarized in Table I.

TABLE I

| Compound tested | $ED_{50}$ in mg./kg. for— | | | $LD_{50}$ in mg./kg. | Therapeutic index $LD_{50}$/ $ED_{50}$, Test 2 |
|---|---|---|---|---|---|
| | Test 1 | Test 2 | Test 3 | | |
| 2-methyl-3-o-tolyl-4-(3H)-quinazolinone | 200 | 350 | 420 | 640 | 1.8 |
| 1,3-dimethyl-4-(2'-ethylphenyl)-1,2,4-triazolone-(5) | 145 | 231 | 315 | 780 | 3.4 |
| 1,3-dimethyl-4-(2'-methyl-4'-chlorophenyl)-1,2,4-triazolone-(5) | 158 | 285 | 369 | 1571 | 5.5 |
| 1-methyl-3-ethyl-4-(2'-methyl-4'-chlorophenyl)-1,2,4-triazolone-(5) | <84 | 118 | 151 | 436 | 3.7 |
| 1-methyl-3-n-propyl-4-(2'-methyl-4'-chlorophenyl)-1,2,4-triazolone-(5) | <89 | 124 | 490 | 514 | 4.2 |
| 1,3-dimethyl-4-(2'-chlorophenyl)-1,2,4-triazolone-(5) | 48 | >225 | | 250 | <1.8 |
| 1,3-dimethyl-4-(2',4'-dichlorophenyl)-1,2,4-triazolone-(5) | 48 | 94 | | 580 | 8.2 |

It is easily seen from Table I that the compounds of the invention not only possess superior sedative and hypnotic effects as compared to 2-methyl-3-o-tolyl-4-(3H)-quinazolinone but also possess a more favorable therapeutic index.

Various modifications of the process and compositions of the invention may be made without departing from the spirit or scope thereof, and it is to be understood that the invention is to be limited only as defined in the appended claim.

We claim:
1. 1,3 - dimethyl-4 - (2',4'-dichlorophenyl)-1,2,4-triazolone-(5).

References Cited

FOREIGN PATENTS 971,606   9/1964   Great Britain.

ALTON D. ROLLINS, Primary Examiner

U.S. Cl. X.R.

424—269